(12) United States Patent
Austin et al.

(10) Patent No.: US 6,617,270 B1
(45) Date of Patent: Sep. 9, 2003

(54) POROUS CERAMIC MATRICES

(75) Inventors: Wayne Austin, Sheffield (GB); Rodney Martin Sambrook, Chesterfield (GB); Yan Yin, Sheffield (GB)

(73) Assignee: Dytech Corporation Limited (GB)

( * ) Notice: Subject to any disclaimer, the term of this patent is extended or adjusted under 35 U.S.C. 154(b) by 0 days.

(21) Appl. No.: 09/831,953

(22) PCT Filed: Nov. 15, 1999

(86) PCT No.: PCT/GB99/03798
§ 371 (c)(1),
(2), (4) Date: May 15, 2001

(87) PCT Pub. No.: WO00/29353
PCT Pub. Date: May 25, 2000

(30) Foreign Application Priority Data

Nov. 16, 1998 (GB) ............................................. 9825109

(51) Int. Cl.⁷ ............................................... C04B 38/00
(52) U.S. Cl. .......................................... 501/80; 502/439
(58) Field of Search ........................... 502/439; 501/80, 501/81, 82, 83

(56) References Cited

U.S. PATENT DOCUMENTS 5,746,957 A    5/1998    Fanelli et al.

FOREIGN PATENT DOCUMENTS

| EP | 0202004 | 11/1986 |
|----|---------|---------|
| EP | 0353669 | 2/1990 |
| EP | 0767154 | 4/1997 |
| GB | 1109140 | 4/1968 |

OTHER PUBLICATIONS

Database WPI Section CH, Week 198437 Derwent Publications Ltd. London GB, AN 1984–229042, XP002136107 & JP 59 137376, A (Kyushiu Refractories Co Ltd) Aug. 7, 1984.

International Search Report for PCT/GB99/03798 no date.

Primary Examiner—Stanley S. Silverman
Assistant Examiner—Edward M. Johnson
(74) Attorney, Agent, or Firm—Caesar, Rivise, Bernstein, Cohen & Pokotilow, Ltd.

(57) ABSTRACT

A dispersion is made up of water refractory particles and material for forming pores and a polymeric dispersion. A water sensitive destabilising agent is added to increase the viscosity of the mix and cause it to solidify to form a green body which is removed from a mould and then heated and sintered.

19 Claims, 1 Drawing Sheet

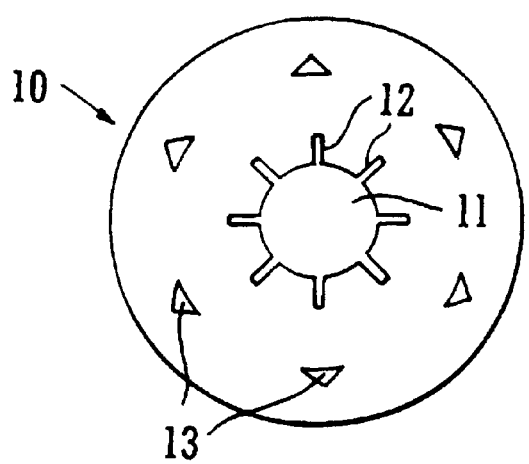

POROUS CERAMIC MATRICES

The present invention relates to a process for producing a porous ceramic matrix, for catalyst materials and like purposes.

It is one object of the invention to provide an efficient method for forming a porous ceramic matrix capable of different industrial uses.

EP-A-0353669 discloses a method of forming an article by pressing a free-running mixture of water, a ceramic powder, combustible organic substances (coconut shell granulate and/or cellulose granulate), a binder and optionally a lubricant, drying the pressed body and firing to decompose the organic substances.

EP-A-0767154 discloses a method for forming solid, homogenous or porous shaped bodies from a powder selected from metals, intermetals, hard metals, cermets and/or ceramics comprising the following steps:

a) preparing of an aqueous slurry of the powder and a protein substance which is soluble in water at ambient temperature and capable of forming an irreversible gel on heating to a temperature of 90° C.;

b) forming the slurry into a body of the desired shape by moulding, tape casting or drop forming; and c) heating to a temperature at least corresponding to the gelling temperature of the protein.

The content of the protein is suitably 10 to 15% by weight based on the aqueous phase which makes the process of dispersion difficult and limits the amount of solids which can be dispersed. In examples 1, 2 and 3 of this document, the content of solids is 32 vol. %, 20 vol. % and 37 vol. % respectively.

According to the invention in one aspect there is provided a method of making a porous ceramic matrix, the method comprising:

i) forming a dispersion comprising water, refractory particles, at least one pore forming organic material and a polymeric dispersant;

ii) adding a water-sensitive cyclic ester to the dispersion in a concentration of from 1 to $10 \times 10^{-5}$ mole/gm of dispersion;

ii) placing the dispersion in a mould;

iv) allowing or causing the cyclic ester to be hydrolysed to cause an increase in the viscosity of the mix thereby to cause it to solidify and form a green body;

v) removing the green body from the mould; and vi) heating the green body to remove water and burn away the organic material.

In the examples which follow the concentration of cyclic ester is always less than 1% by weight and the concentration of solids is always above 50 vol. %.

The refractory particles may be selected from a wide variety of metals or non-metals. The particles may be so-called low surface area, medium and high surface area materials. These are exemplified respectively by values of about 0.1 to about 20 $m^2/g$; about 20 to about 200 $m^2/g$; and about 200 to about $1000^2/g$. Medium surface area materials include transition aluminas, kieselguhr and activated clays. Examples of low surface area particles are alpha alumina, mullite, cordierite, fused silica, zirconia, titania; camma alumina some carbon and silica and many alumina hydrates such as boehmite, gibbsite, and bayerite are representative of high surface area materials. Other materials are copper, zinc, hydroxycarbonates; metal oxides such as nickel oxide (which can be reduced to the metal to provide nickel sponge); aluminosilicates, silicon carbide, silicon nitride; and the like.

The polymeric dispersant may be any substance suitable for the purpose. Examples include acrylates, polyacrylates and the like; one specific example is ammonium polyacrylate.

Preferably the pore-forming material is particulate, the dimensions being chosen to determine the size of the pores. Preferably the particles are of different sizes and shapes, so that interconnections are more easily made. The pore-forming material may be selected from a wide variety of natural or-synthetic organic substances. Examples include carbon fibre or powder; almond shelf, coconut shell particles, olivestone powder, wood flour, chopped cotton fibres; chopped fibres of polyester, nylon, polymer beads, stearates, extrudates, granules of polystyrene or polypropylene; or the like. The content and nature of the pore-forming material may be used to control porosity and pore size distribution in the matrix.

To be suitable for the purposes of this invention the water sensitive cyclic ester must be one which will form a substantially homogenous dispersion with the other ingredients and will hydrolyse in a reasonable time period to form a shaped article which is sufficiently rigid in the green state to be de-moulded from the mould.

The rate of hydrolysis is selected so that a demouldable composition is formed within say from 10 minutes to a few hours. If it is too slow the technique is not acceptable industrially, and if it is too fast the composition will set during casting and defects will form inside the green body.

The water sensitive cyclic ester may be selected from a variety of substances. Preferably the ester is a cyclic ester, examples being carboxylic lactone and lactide. Suitable candidates for the present invention include:

very fast reacting agents such as delta-glucono-lactone, 3,6-dimethyl-1, 4-dioxane-3,5-dione and other 6-ring-membered lactones and lactides;

fast reacting agents such as: alpha-D-glucoheptonic gamma lactone, D-glucorono-6,3-lactone, L-gulonic-gamma lactone, D-gulono-1,4-lactone, L-mannonic-gamma lactone, D-erythronic-gamma lactone, alpha-hydroxy-gamma-butyrolactone, delta-valerolactone, alpha-angelicalactone, and other 5-ring-membered lactones with no more than three Methyl side-groups;

medium rate reacting agents such as: beta-butyrolactone and other 4-ring-membered lactones; and slow reacting agents such as: pantolactone, epsilon-caprolactone, gamma-butyrolactone, gamma-valerolactone, and other high ring-membered lactones and lactones with more than three methyl side groups.

Typically the concentration of the agent is about 1 to $10 \times 10^{-5}$ mole per gram of the dispersion, preferably $2-5 \times 10^{-5}$ mole per gram of the dispersion. Increasing concentrations will shorten the period before the composition has set.

Preferably the temperature of the mix is reduced below ambient to slow the rate of hydrolysis and thereby improve the homogeneity of the suspension on addition of the agent. Upon the addition of the destabilising agent, the viscosity starts to rise. At lower temperatures the rate of viscosity increase is much lower because the kinetics of the reaction are lowered. Working at a lower temperature (not too low otherwise the water present in the system will freeze) would allow a much longer time in which to mix in the agent. A preferred temperature range is between about 0° C. and 20° C., preferably between 0° C. and 10° C. before the addition of the destabilising agent. A mixing stage may result in the entrapment of air. If needed, therefore, the method may include the step of applying a vacuum to the composition to remove air bubbles introduced by mixing.

BRIEF DESCRIPTION OF THE FIGURE

The FIGURE depicts a cylinder shaped body.

In a preferred feature the mixing and air removal are carried out after which the composition is poured into a mould whereby a moulded article is formed from the mouldable composition, following which it is removed from the mould.

In another preferred feature the method includes the subsequent step of heating the mix to accelerate the rate of hydrolysis. Warming in a controlled manner will cause further hydrolysis and the viscosity will increase so allowing production of moulded articles.

Preferably the formed ceramic matrix has an apparent porosity in the range from less than 20% to about 70% depending on the intended application.

In a preferred feature the heating to remove water and burn away the pore forming material is also carried out to sinter the ceramic matrix.

It is an advantage of the invention that matrices of complex shape can be produced in a simple way. The complex shape has an increased geometric surface area. This property can be put to good use in a number of industrial applications. For example the matrix may be used to carry catalysts, giving matrices of high efficiency because of the high catalyst metal loading, the enhanced geometric surface area and the reduced resistance to gas flow. One specific use is as a carrier for catalysts in which case a catalytically active component is introduced into the pores and onto the exterior surface of the carrier. Wash-coating may be employed. Spacers and/or promoters may also be introduced simultaneously. Other uses for the porous ceramic matrix of the invention are preforms of dual phase ceramic particulate/ceramic matrix composites; aeration and diffusion plates; gas and liquid filters; cross flow micro-filtration elements; and the like.

The term "catalytically active component" as used herein means a metal or compound thereof that has catalytic activity either as formed or when in a reduced or otherwise activated state. The term "spacer" means a material that helps to stabilise small crystallites of the metallic catalytic agent, for example, by preventing these particles coalescing, and the term "promoter" means a material which brings about a different selectivity in the catalyst compared with the material without promoter, for instance by preventing undesirable side-reactions such as coke formation, etc.

A specific advantage of a method of the invention lies in the fact that minimal reagent loss occurs and in contrast with other methods of precipitation or impregnation the active phase is almost exclusively confined to the pores of the matrix.

The porous carrier matrix may be pretreated with acid or alkali to modify the interaction of the catalytically active material; and the walls of the pores. The wall surface may also be modified by the addition of "spacer/support" material, e.g. alumina within the pores of the ceramic matrix prior to the addition of the active phase. This may be accomplished by the simple impregnation of the porous matrix with a soluble salts of the "spacer/support" material, e.g. aluminium nitrate or by using the homogenous precipitation technique. In each case the temperature of the calcination of the impregnated ceramic matrix must be carefully controlled to achieve the required surface properties.

Preferably to locate the active phase within the porous ceramic carrier, the matrix is impregnated, preferably under vacuum, with a solution of soluble salts containing the required catalytic components and the hydrolysable material, the ceramic matrix then being removed from the solution and drained. After draining, the ceramic matrix is heated to a temperature suitable for the controlled hydrolysis of the hydrolysable material, thus increasing pH of the absorbed solution and bringing about deposition of the insoluble oxides within the pores. This effectively blocks the pores to further impregnation.

The metal loading of the catalyst may be increased by repetition of the process steps. Prior to re-impregnation of the catalyst the pores must be opened. In one aspect of the process the pores may be opened by thermal decomposition of material within the pores. Alternatively the catalyst is washed with water or weaker alkaline solution and.then dried at a suitably elevated temperature. The catalyst of the required metal loading is subjected to a final calcination temperature of about 450° C.

Where the matrix is made of particles of high surface area, it may be used to form a catalyst foam having the advantage of light weight and enhanced activity. A matrix of the invention may be used to form a heat exchanger.

The invention is illustrated by the following examples which are given by way of illustration only.

EXAMPLE I

A suspension was produced by mixing together 85 g alumina (A16SG, Alcoa, Bauxite, Ark., 72011, USA), 15 g almond shell powder (100mesh), 0.05 g 4,5-dihydroxy-1,3-benzendisulphonic acid disodium salt monohydrate, 0.2 ml ammonia water (35% $NH_3$), and 25 g water. The pH of the suspension was between 9 and 10. After standing at room temperature for 2 hours, 1.0 g (equivalent to $4.5 \times 10^{-5}$ mol/g) of D-gulono-1,4-lactone was mixed into the suspension. The mix was then poured into a plastic or metal mould and held for three hours at 22° C. The part was demoulded, dried and sintered at 1520° C. for 30 minutes. The green density was 1.76 $g/cm^3$ and sintered density 2.36 $g/cm^3$ equivalent to a porosity of 40%.

EXAMPLE II 180 g alumina (A16SG), 20 g olivestone powder (article size 100mesh), 0.6 g Dispex A40 (DISPEX is a trade mark), 0.3 ml ammonia water and 50 g water were mixed together to make a suspension with pH around 9.5 and viscosity less than 1 Pa s. After being held at room temperature for 1 hour, the suspension was further mixed with 2.0 g D-gulono-1,4-lactone for 1 minute and the mix was then cast into a rubber mould. After 2 to 3 hours the solidified mix was demoulded and dried at room temperature for 1 day followed by drying in an oven for two more days at 40° C. The green body was heated at a ramp rate of 4° C./min to 1520° C. and soaked for 30 minutes. The sintered shape had a porosity of 35%.

EXAMPLE III

A cylinder shaped body 10 as shown in the figure of the accompanying drawings was made in a mould containing a suitably shaped former and using the recipe shown in Example I. The cylinder has a main bore 11 which is of polygonal shape, and all the arms or extensions 12 were symmetrical. The same was true of the radially spaced apart side bores 13 which are of generally irregular shapes. The shapes and spatial arrangement of these bores (including internal interconnections) were designed so as to increase the geometrical surface area and improve gas flow uniformity while maintaining the mechanical strength of the matrix. The bulk density of the formed body was 0.9 g/cm³. The geometric surface area increased by about 55% compared to the Raschig ring of the same size and by about 30% compared to the fluted ring matrices.

What is claimed is:

1. A method of making a porous ceramic matrix, the method comprising the steps of:
   i) forming a dispersion comprising water, refractory particles, at least one pore-forming organic material and a polymeric dispersant;
   ii) adding a water-sensitive cyclic ester to the dispersion;
   iii) placing the dispersion in a mold;
   iv) allowing or causing the water-sensitive cyclic ester to be hydrolysed to cause an increase in the viscosity of the mix thereby to solidify and form a green body;
   v) removing the green body from the mold; and
   vi) heating the green body to remove water and burn away the organic materials.

2. A method according to claim 1, wherein the concentration of the water-sensitive cyclic ester is from 1 to $10 \times 10^{-5}$ mole/gm of the dispersion.

3. A method according to claim 2, herein the concentration of the water-sensitive cyclic ester is from 2 to $5 \times 10^{-5}$ mole/gm of dispersion.

4. A method according to claim 1, wherein the cyclic ester is selected from the group of a carboxylic lactone or lactide.

5. A method according to claim 4, wherein the water-sensitive cyclic ester is selected from the group of delta-glucono-lactone, 3,6-dimethyl-1,4-dioaxane3,5-dione and other 6-ring-membered lactones and lactides.

6. A method according to claim 4, wherein the water sensitive cyclic ester is selected from the group consisting of alpha-D-glucoheptonic gamma lactone, D-glucorono-6,3-lactone, L-gulonic-gamma lactone, D-gulono-1,4-lactone, L-mannonic-gamma lactone, D-erythronic-gamma lactone, alpha-hydroxy-gamma-butyrolactone, delta valerolactone, alpha-angelicalactone, and other 5-ring-membered lactones with no more than three methyl side groups.

7. A method according to claim 4, wherein the water-sensitive cyclic ester is selected from the group of beta-butyrolactone and other 4-ring-membered lactones.

8. A method according to claim 4, wherein the water-sensitive cyclic ester is selected from the group consisting of pantolactone, epsilon-caprolactone, gamma-butyrolactone, gamma-valerolactone, and other high ring-membered lactones and lactones with more than three methyl side groups.

9. A method according to claim 1, including the step of applying a vacuum at step (ii) to remove air bubbles introduced by the mixing.

10. A method according to claim 1, comprising heating the mix at step (iv) to accelerate the rate of hydrolysis.

11. A method according to claim 1, wherein at step (iv) the temperature of the mix is reduced to slow the rate of hydrolysis and thereby improve the homogeneity of the formed composition.

12. A method according to claim 11, wherein the pore-forming organic material is in particulate form.

13. A method according to claim 1, wherein the content of the pore forming material is adjusted to control the porosity of the matrix.

14. A method according to claim 13, wherein the pore-forming material is selected from the group comprising carbon fibre or powder; almond shell, coconut shell particles, olivestone powder, wood flour, chopped cotton fibres, chopped fibres of polyester, nylon, polymer beads, stearates, extrudates, granules of polystyrene or polypropylene.

15. A method according to claim 1, wherein the polymeric dispersant is selected from the group of acrylates and polyacrylates.

16. A method according to claim 1, including the subsequent step of loading catalyst particles into the pores of the formed porous ceramic matrix.

17. A method according to claim 1, including the subsequent step of loading catalyst particles on the exterior surface of the formed porous ceramic matrix.

18. A method according to claim 1, including the step of selecting refractory particles which have a low surface area.

19. A method according to claim 1, including the step of selecting refractory particles which have a high surface area.

* * * * *